3,495,954
PRECIPITATION PROCESSES FOR METAL-CONTAINING MATERIALS
John Herbert Grimes, Basingstoke, and William Dress, Newbury, England, assignors to United Kingdom Atomic Energy Authority, London, England
Filed Mar. 27, 1967, Ser. No. 626,188
Claims priority, application Great Britain, Apr. 7, 1966, 15,525/66; Oct. 21, 1966, 47,422/66
Int. Cl. C22b *61/04;* C01g *56/00*
U.S. Cl. 23—328                         15 Claims

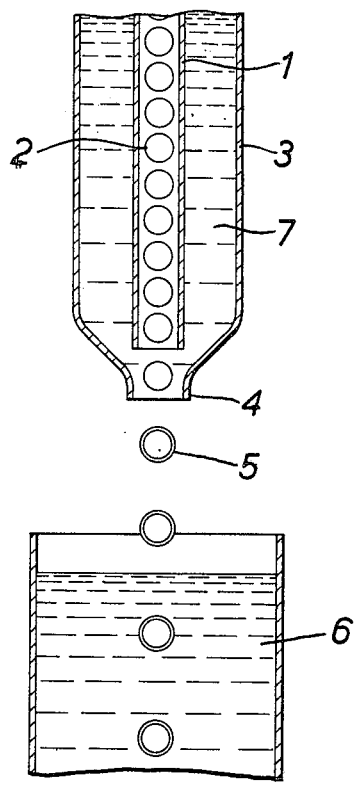

ABSTRACT OF THE DISCLOSURE

To a solution of a soluble salt of the relevant metal or metals is added a polymeric organic compound, e.g. a polysaccaride such as dextran, which renders the solution viscous and forms a complex with the metallic ions. The viscous solution is formed into a suitable physical configuration, and treated with a further solution to precipitate the metal or metals as insoluble compounds, e.g. to produce particles, an acidic viscous solution can be introduced drop-wise into an alkaline precipitating solution. The organic compound can be driven off by heating.

BACKGROUND OF THE INVENTION

This invention relates to the production of metal-containing materials and has one application in the production of particles of the oxides or carbides of uranium, plutonium and thorium (or of mixtures of these metals) for use as nuclear reactor fuels. Further applications are to the production of metallic particles of other metals for powder metallurgy, and of particles of insoluble metallic compounds other than oxides or carbides, and to the production of metal-containing materials in other than particulate form.

In French Patent No. 1,400,238 there is described a process for the production of pellets or spheres of refractory materials, e.g. oxides and carbides, by adding to a solution of the compound from which the pellets or spheres are to be formed, a resin whose viscosity increases in the presence of alkaline. The resin used in an example of the process is hydroxy propyl methyl cellulose. The resin-containing solution is introduced drop-wise into an alkaline solution, and the resulting increase in viscosity of the resin causes the formation of spheres or pellets of the compound, which can be dried and calcined.

It has been found that, in practice, the above-described process is difficult to operate. The solubility of hydroxy propyl methyl cellulose in acid metallic solutions is low, making its dispersion in such solutions slow and difficult, and requiring an additional dispersing agent for complete dispersion. Moreover the spheres obtained when the solution is dropped into alkaline are soft and fragile, and thus difficult to handle for subsequent drying and calcining.

It is one object of the present invention to provide a process for producing metal-containing particles, not necessarily spherical in form, in which the above-described difficulties are alleviated, but material can also be produced in other desired physical configurations. The present process does not depend on the increase in viscosity of an additive in the presence of alkali, as in the French patent, but evidently involves a chemical complexing action.

SUMMARY OF THE INVENTION

According to the present invention a process for the production of metal-containing material comprises adding to a solution of a soluble salt of a metal a polymeric organic compound adapted to form therewith a viscous solution and to form a complex with the metallic ions, causing said viscous solution to adopt a selected physical configuration, and treating said configuration with a further solution adapted to precipitate said metal as an insoluble compound.

The polymeric organic compound may be a polysaccharide, for example dextran, carob gum, gum arabic, or siccolin, or may be polyvinyl alcohol.

Dextran is a polysaccharide formed by organisms of the Leuconostoc group growing upon sucrose and having a molecular weight up to above $5 \times 10^6$. It has been found to be surprisingly stable in concentrated acid solutions and to disperse very readily in acid or alkaline solutions of metallic salts. Carob gum, siccolin and gum arabic are complex polysaccharides which are found to behave similarly to dextran in the present process, as does polyvinyl alcohol. Ultraviolet spectroscopic evidence indicates that dextran forms a complex with the metal ions in the solution, and this complexing action is believed to contribute to the good strength and stability of the products formed on precipitation.

The strong similarity in chemical structure and behaviour to dextran of the other compounds mentioned above, as discussed below, indicates that with these compounds too, complex formation is the operative mechanism in the present process.

DEXTRAN

Dextran is a polymer of glucose consisting of 95% $1 \rightarrow 6$ linked anhydro D-glucopyranose units, the remaining 5% consisting of $1 \rightarrow 4$ and $1 \rightarrow 3$ linked D-glucopyranose units. The number of non $1 \rightarrow 6$ links varies widely depending on the organism used to synthesise the dextran. The figures quoted are for dextran produced by Leuconostoc Mesenteroides strain B512.

CAROB GUM (LOCUST BEAN GUM)

Carob gum is produced from the seeds of Ceratonia Siliqua and consists of about 90% D-galacto D-manno glycan, together with 4% of pentaglycan and 6% protein. The major constituent consists of $1 \rightarrow 4$ linked D-mannopyranose units, of which every fifth one (approximately) is substituted on C6 with a D-galactopyranose side-chain. It has a molecular weight of about $3 \times 10^5$.

GUM ARABIC

Gum arabic is a very complex polysaccharide whose main chain consists of D-galactopyranose units which may be $1 \rightarrow 3$ linked or alternately $1 \rightarrow 3$ and $1 \rightarrow 6$ linked. Each galactopyranose unit is substituted with side-chains which are of complex structure containing L-arabofuranose, L-rhamnopyranose and D-glucuronic acid. The full structure has not been completely determined. The molecular weight is of the order of $3 \times 10^5$.

SICCOLIN

Siccolin is prepared by treating starch with sodium hydroxide and then neutralising the alkali. It is a proprietory material of which no detals of structure or molecular weight are known. However, since starch is a polysaccharide base on glucose, it must follow that siccolin is also a polyglycoside of perhaps modified chain length and degree of branching.

POLYVINYL ALCOHOL

Polyvinyl alcohol is a synthetic product prepared by hydrolysis of polyvinyl acetate. It has a linear structure consisting of a chain of carbon atoms of which every third one is substituted by a hydroxyl group. Commercial grades may contain a proportion of residual acetate groups. The molecular weight of the material used in the present examples is not known, but it has a quoted viscosity of 4–6 cps. at a concentration of 4% in water.

Apart from polyvinyl alcohol, the above compounds are polysaccharides which, from the evidence for dextran, would be expected to form metal complexes more or less strongly with metallic ions, depending on the metallic ion and on the size, number, distribution and spatial configuration of the —OH groups in the compound.

Sugars are polyhydric alcohols and polysaccharides are linear chain polymers with a profusion of —OH groups along the length of the molecule, which has the ability to contort and present its complex-forming groups (the —OH groups) to the metallic ion in the most favourable way to form the metallic complex, as related to the spatial valency characteristics of the metallic ion.

Polyvinyl alcohol, although not a polysaccharide, is a linear polymer with a profusion of —OH groups along their length of the molecule. It possesses the properties of coordination and complex formation with metallic ions, and has the ability to contort and satisfy the spatial valency characteristics of some metallic ions. As it also possesses the usual solubility and viscosity characteristics of high polymers, its mode of action in the present process would be expected to be similar to the polysaccharides, because of the functional similarity.

In addition to their common chemical property of complex formation with metallic ions, the common property of these compounds of forming aqueous solutions which are viscous facilitates the formation of desired physical configurations in the present process.

After precipitation and drying, the organic compound may be driven off by heating to leave a metal-containing material having the desired configuration.

To form metal-containing spheres or other particles, the viscous solution may be introduced dropwise into said further solution.

A rod-like configuration may be produced by extruding said viscous solution into said further solution. By extruding the solution annularly through a nozzle through which a core is passed simultaneously (e.g. a rod or wire) a coating of the material may be formed thereon.

A configuration as a coating on discrete entities may be produced by immersing the entities in said viscous solution followed by immersion in said further solution. The entities may be particles which are passed through said viscous solution to pick up a surface layer thereof and thereafter passed into said further solution.

The configuration may be produced by introducing the viscous solution into a mould together with a known gelling agent such as a thermogelling methyl cellulose/water system (e.g. Dow methocel), removing the gelled solution from the mould, and treating the gelled solution with said further solution.

In some applications e.g. using dextran to produce pharmaceutical pills by the dropping technique, it may not be necessary to drive off the dextran after drying, dextran being physiologically acceptable.

After driving off the organic compound, the metal-containing spheres or other particles produced by the dropping technique can be used in powder-metallurgical processes to produce artifacts of various kinds, such as nuclear reactor fuel elements. For such purposes irregular particles, known as "aggregate" or "gravel" may be preferable to spherical particles, and the present process allows such irregular particles to be produced either by direct formation on precipitation (using low concentrations of the organic compound), or by fracture during drying of spheres, or by crushing dried spheres.

In using the dropping technique, preferably a slow, counter-current flow of the precipitating solution relative to the motion of the drops is maintained, and the resulting spheres are preferably aged by prolonged immersion in the solution prior to washing and drying.

The spheres as formed in the solution are usually transparent and are rubbery in consistency, and do not adhere to each other even in layers several centimetres deep, and even when drying. They are easily handled and can be poured from one container to another. They tend to become harder and tougher as they dry. If dried too quickly, the surface of the spheres may contract before the centre, leading to breakup of the spheres, but where irregular particles are wanted, this may be desirable. The spheres can be dried at room temperature or above.

Suitable soluble metallic salts are, for example, nitrates, chlorides, oxalates and fluorides, and the solution may contain the salts of one or more metals depending on the desired metallic composition of the resulting spheres. Total metal concentrations of up to 500 g./l. have been found suitable, limited by the solubility of the salt.

The nature of the precipitating solution depends on the desired metallic compound. For example, to produce spheres of oxide or hydroxide, the precipitating solution may be ammonium hydroxide or another strong alkali such as sodium hydroxide, of about 5–50% concentration. Similarly, insoluble carbonate spheres may be produced using ammonium carbonate or sodium carbonate as the precipitating solution. For other compounds an acidic precipitating solution may be used.

Using dextran, the concentration may be in the range 5–200% by weight of the weight of metal used, preferably in the range 15–100%, depending on the desired product. The effect of increasing the concentration, as of increasing the molecular weight of the dextran, is to increase the viscosity of the salt solution. For the production of irregular particles, dextran concentrations at the lower end of the range are preferably used.

To produce carbide spheres, carbon may be dispersed in the metallic solution, prior to dropping, in the quantity required to form metallic carbides by firing the spheres.

The sphere diameter depends on the metal ion concentration and on the diameter of the orifice which forms the drops. Typically a metal ion concentration of about 200 g./l. and 1 mm. diameter capillary tube will give "green" undried spheres of about 3–4 mm. diameter, which shrink to about 1.5 mm. when dried in air.

Suitable apparatus for use in the dropping technique comprises a cylindrical vessel, typically about 60 cm. in height, having a sintered bottom plate and a side-arm located about 10 cm. from the top of the vessel. The precipitating solution is circulated upwards through the sintered plate and extracted through the side-arm to provide counter-current conditions relative to the descending spheres. The drops are formed at the end of a capillary tube suspended above the surface of the precipitating solution, into which they fall to form the spheres. In the examples to be described, the precipitating solution was continuously circulated through the spheres, which collect on the sintered plate, at a flow-rate about 300 ml./min. during precipitation and ageing.

Instead of forming the drops with a capillary, other methods of drop formation may be used. For example the metallic solution may be sprayed into the precipitating solution by means of an atomiser or by a spinning disc technique.

The spheres can be washed in cold flowing water. For example, about 3 volumes of water per volume of spheres is suitable when using soluble metal chlorides or nitrates, washing being continued until the acid content of the effluent is less than 30 p.p.m. Alternatively the spheres may be boiled in water to assist rapid removal of unwanted soluble substances.

DESCRIPTION OF THE DRAWING

The accompanying drawing is a diagrammatic sectional elevation of apparatus suitable for coating particles, e.g. nuclear fuel particles, with e.g. ceramic coatings, by means of the present process.

EXAMPLES OF THE PRESENT PROCESS

The following are examples of the process of the present invention applied to nuclear fuel and other materials.

Example 1

To 10 mls. of a solution in 2 M nitric acid containing 100 gms./litre uranium and 100 gms./litre thorium was added 2.0 gms. dextran (M.W. $5 \times 10^5$). (Dextran nominally described as having a M.W. of $5 \times 10^5$ in fact contains a distribution of M.W.'s; typically about 5% by weight is below $1.5 \times 10^5$ and about 10% above $7.5 \times 10^5$. Similar sorts of distribution apply to other nominal molecular weights.)

The resulting solution was dropped through a 1 mm. capillary orifice into a solution of ammonium hydroxide (s.g. 0.910) at 20° C., the rate of dropping being about 3 drops per second. The spheres were aged for ½ hour, the ammonia solution decanted off, and the spheres washed with 3 volumes of cold water, drained and spread out to dry in air for 14 hours at room temperature.

The resulting spheres were hard, transparent, glassy beads, amber in colour and about 1.5 mm. diameter.

Example 2

To 10 mls. of a solution in 2 M nitric acid containing 50 gm./litre uranium and 50 gms./litre thorium was added 2.0 gms. dextran (M.W. $5 \times 10^5$).

The spheres were formed as in Example 1.

The spheres produced were of similar appearance to Example 1 but were lighter in colour, slightly smaller and softer.

Example 3

To 10 mls. of metal solution (100 gms./litre uranium and 100 gms./litre thorium in 2 M nitric acid) was added 2.0 gms. dextran (M.W. $4 \times 10^4$).

The spheres were formed as in Example 1.

The spheres produced were of similar appearance to Example 1 but required more careful handling.

Example 4

A suspension of carbon black was prepared by colloid milling 50 gms. carbon black with 250 mls. of 2 M nitric acid and 5 gms. of dextran (M.W. $2.5 \times 10^5$), giving a stable dispersion of carbon containing about 0.2 gm. carbon per millilitre.

To 10 mls. metal solution (100 gms./litre uranium and 100 gms./litre thorium in 2 M nitric acid) was added 2.5 mls. of this carbon dispersion and 2.5 gms. dextran (M.W. $5 \times 10^5$).

The spheres were formed as in Example 1.

After air drying for 12 hrs. at 25° C., the spheres were black, glossy and very hard.

Example 5

4.12 gms. $UO_3(NO_3)_2 \cdot 6H_2O$ and 4.6 gms.

$$Th(NO_3)_4 \cdot 4H_2O$$

were dissolved in 2 M nitric acid and made up to 10 mls. To this solution was added 2.0 gms. dextran (M.W. $5 \times 10^5$) and spheres formed as in Example 1.

After drying the spheres were glassy, transparent, orange in colour and very hard.

Example 6

To 10 mls. of a solution in 2 M nitric acid containing 200 gms./litre uranium was added 0.36 gms. of dextran (M.W. $3 \times 10^5$) giving by the method of Example 1 orange spheres of good quality.

Example 7

To 10 mls. of a solution in 2 M nitric acid containing 250 gms./litre of thorium was added 2.5 gms. of dextran (M.W. $5 \times 10^5$).

The resulting spheres, produced as in Example 1, after drying were colourless, transparent and very hard.

Example 8

To 10 mls. of a strong nitric acid solution containing 100 gms./litre uranium and 100 gms./litre plutonium was added 2 gms. of dextran (M.W. $5 \times 10^5$). After treatment as in Example 1 good hard glassy spheres were obtained.

Example 9

To four 10 mls. aliquots of a saturated solution of uranyl nitrate in 2 M nitric acid was added dextran (M.W. $5 \times 10^5$) in the following quantities respectively: 0.5 gm., 1.0 gm., 1.5 gm., 2 gm.

In all four cases spheres were readily formed by the procedure of Example 1. In the case of the low dextran/metal ratios (viz, 0.5 gm. and 1.0 gm.), the spheres could be more readily made to fracture by rapid drying into two or more pieces, and were then suitable for the production of irregular aggregate or gravel by heating to drive off the dextran.

Example 10

To three 10 mls. aliquots of a 200 mls. solution of 2 M nitric acid containing 100 gms. of uranyl nitrate and 110 gms. thorium nitrate was added dextran (M.W. $5 \times 10^5$) in the following quantities respectively: 1 gm., 1.5 gms., 2.0 gms.

In all three cases transparent spheres were formed by the procedure of Example 1 which could be used as such or readily induced to fracture by rapid drying for the production of aggregate-type material.

In the above examples, the products are dry spheres, or pieces thereof, containing uranium and/or thorium as ammonium diuranate and hydrated thorium oxide respectively. Hard spheres of pure oxide (or in the case of Example 4, carbide) can be obtained by heating the dry spheres to decompose and drive off the dextran (conversion to carbide requiring heating to a higher temperature in an inert atmosphere).

Example 11

Ammonium diuranate spheres produced as in Example 1 were placed in an electrically heated tube furnace supplied with a gas atmosphere at controlled pressure. The furnace was heated at a rate of 100° C./hr. to 1200° C. while maintaining a pressure of 40 mm. of a gas mixture consisting of 95% argon and 5% hydrogen. After maintaining for 4 hrs. at 1200° C., the furnace was cooled to room temperature to give hard black spheres of $UO_2$.

The present process can be applied to produce metallic particles by heating the oxide particles in a reducing atmosphere such as hydrogen or carbon monoxide. It can also provide particles in which the oxide of a non-readily-reduced metal dispersed in a metal formed from a readily reduced oxide, by dropping a mixture of the two metal salts plus e.g. dextran in strong acid into a strong alkali solution and treating the resultant particles in a reducing atmosphere as described.

Example 12

To 10 mls. of a solution of ferric chloride in 2 M hydrochloric acid containing 50 gm./litre of iron was added 2 gms. of dextran (M.W. $5 \times 10^5$), and spheres produced as in Example 1. The spheres as formed were orange brown in colour but rapidly darkened until after ageing for ½ hour in the ammonia solution they were black. After washing and drying, they were hard black glossy spheres about 1.5 mm. in diameter.

Example 13

To 10 mls. of a solution in water containing 3 moles/litre of $FeCl_3 \cdot 6H_2O$ was added 0.5 gm. dextran (M.W. $5 \times 10^5$), and spheres formed by dropping through a capillary tube into ammonia solution (S.G. 0.880). After ageing and washing as already described, the spheres were dried in air whereupon they fractured to give a granular material suitable for reduction to iron powder.

Example 14

Spheres produced as in Example 12 were heated in the furnace described in Example 11 and under the same conditions. The product was spongy gray iron powder which assayed as iron containing about 0.25% oxygen and 50 p.p.m. carbon.

Example 15

To 10 mls. of a solution in 2 M nitric acid containing 1 mole of nickel nitrate and 1 mole of chromium nitrate per litre was added 2 gms. of dextran (M.W. $5 \times 10^5$) and spheres formed by dropping into 3 M sodium hydroxide solution. After ageing and washing, the spheres were dried in air to give hard, glossy, dark-green spheres, some of which were reduced, as described in Example 14, to give gray porous spheres of nickel chromium alloy.

Example 16

To 10 mls. of a solution in 2 M nitric acid containing 50 gm./litre iron and 50 gm./litre thorium was added 2 gms. dextran (M.W. $5 \times 10^5$) and spheres formed as in Example 1. After drying, the spheres were heated in a furnace, as described in Example 11, to give spheres of a dispersion of iron in thorium oxide.

EXTRUSION

Example 17

To 20 mls. of a solution of thorium nitrate in 2 M nitric acid containing 350 gms. of thorium/litre was added 8 gms of dextran (M.W. $5 \times 10^5$), and the very viscous solution was extruded through a 2.4 mm. die whose tip was immersed in 0.880 ammonia solution. The extrusion rate was in the range 2.2–12.5 cm./sec. After ageing for 1 hour in the ammonia, the extruded rod was washed in running water until free of anions and excess ammonia, giving a strong, tough flexible rod containing thorium as thoria which could be coiled, knotted, etc. When dried, the rod was harder and more brittle, but retained any configuration into which the wet rod had been formed.

Example 18

A dextran-containing ferric nitrate solution was extruded in a manner similar to Example 17 to produce a rod containing iron as ferric oxide which retained a coiled form on drying.

The dextran can be driven off from these rod-like extrusions by heating as already described. The ferric oxide rod can be reduced to iron by heating in a reducing furnace as already described.

The present process can be used to coat rods or wires with an insulating ceramic by extruding the viscous solution annularly through a nozzle through which the rod or wire is passed simultaneously as a core. For example coatings of alumina or silica can be produced by extruding dextran-containing solutions of aluminum salts (e.g. nitrate or sulphate) or metal silicates into alkaline solutions followed by heat treatment to drive off the dextran and form the respective oxides. Similarly tubes can be produced by using a fixed core.

COATING OF DISCRETE ENTITIES

Example 19

Short lengths of 1–2 mm. diameter silica rod were coated with thoria by dipping them in a solution of 200 gms./litre of thorium in 2 M nitric acid to which 5 gms. of dextran had been added. The excess solution was allowed to drip off and the rods immersed in 0.880 ammonia for 30 mins., being washed and dried thereafter at room temperature. The adhesion of the dried coating, even before heating to drive off the dextran, was such that an attempt to remove the coating also removed the surface of the silica rod.

Coatings, e.g. ceramic coatings, may be applied to particles, e.g. nuclear fuel particles such as uranium or plutonium oxides or carbides, by causing the particles to pass through a solution of the metallic element of the ceramic containing a complex-forming organic compound such as dextran, so that they become coated with a layer of the solution and thereafter passing the particles into the precipitating solution, followed by washing, drying and heating as already described.

Apparatus suitable for forming such coatings is shown in the accompanying drawing. It comprises an inner tube 1 for containing the uncoated particles 2, and an outer coaxial tube 3 having a nozzle 4 located beyond the open end of tube 2 and containing the dextran/metal solution 7. The particles 2 are fed down tube 1 by gravity or applied pressure and pass through the viscous dextran/metal solution in the nozzle of tube 3, thereby picking up a surface layer 5 of the solution before falling into the precipitating solution 6.

After ageing, washing and drying the particles are heated to drive off the dextran and leave an oxide coating. The oxide coating can be reduced to metal if desired or (by adding finely divided carbon to the dextran/metal solution) converted to carbide.

MOULDING

Components of various configurations can be produced by filling a mould with the solution of metal and complex-forming compound to which is preferably added a gelling agent such as thermogelling Dow methocel, agar-agar or cold setting precooked starch. When the solution has gelled, it is removed from the mould and immersed in a precipitating solution followed by removal of the compound (e.g. dextran) as already described. The heating which drives off the compound also removes the gelling agent. In designing the mould, allowance must be made for the shrinkage which takes place upon drying and removal of the compound.

An alternative procedure is to flow the solution of metal and complex-forming compound, without gelling agent, into a porous mould previously impregnated with the precipitating solution. The porous mould may be immersed in a bath of the latter to maintain the supply of precipitating solutions to the compound/metal solution by diffusion.

It will be appreciated that the process is not limited to the use of an acid metal solution and an alkaline precipitating solution, as the following examples show. Although these examples relate to sphere production, other physical configurations can also be produced. Nor is the solution limited to containing only one metal, so that materials containing mixed metallic compounds or alloys can be produced, as in Example 15.

Example 20

A 1 M solution of thorium nitrate containing dextran (M.W. $5 \times 10^5$) amounting to 50% of the mass of metal was fed dropwise from a capillary tube into a 1 M solution of sodium dihydrogen phosphate plus about 5% free phosphoric acid. Dextran-bonded spheres of thorium phosphate were formed which were washed and dried as already described.

Example 21

A 1 M sodium silicate solution (which is alkaline) containing dextran (M.W. $5 \times 10^5$) amounting to 50% of the mass of silicon was fed dropwise from a capillary tube into an acid solution of 2 M ferric chloride. Dextran-bonded spheres of ferric silicate were formed which were washed and dried as in Example 1.

Example 22

To 10 mls. of a solution formed by dissolving sodium tungstate dihydrate (50 gms.) in water (70 mls.) was added 1 gm. dextran (M.W. $5 \times 10^5$). The viscous solution was dropped through a capillary tube into a solution of 70% nitric acid (1 part) and water (1 part) maintained at 50° C., and aged for 1 hour. Under these conditions, dextran-bonded spheres of insoluble β tungstic acid were formed. The spheres were washed and dried as described, and fractured on drying to give a granular product suitable for conversion to tungsten powder.

COMPLEX-FORMING ORGANIC COMPOUNDS OTHER THAN DEXTRAN

Example 23

To 10 mls. of a solution of ferric chloride containing 100 gm./litre of iron was added 0.1 gm. of carob gum and spheres formed by dropping through a capillary into ammonia as described. After washing and drying the spheres had fractured to give a granular product which could be milled to give any desired size range before firing to drive off the gum and reducing to an iron powder.

Example 24

To 10 mls. of a 1 M solution of cupric nitrate in water was added 10 mls. of a 20% solution of polyvinyl alcohol (viscosity 4–6 cps., 4% in $H_2O$) in water, and spheres formed by dropping into 2 M sodium hydroxide. After washing and drying, hard blue spheres were formed.

Example 25

To 10 mls. of a 1 M solution of $Ni(NO_3)_2 \cdot 6H_2O$ was added 2 gms. of polyvinyl alcohol, and spheres formed as in Example 24. After washing and drying, hard, clear green spheres were produced.

Example 26

To 10 mls. of a solution of ferric chloride containing 50 gm./litre of iron was added 2 gms. of gum arabic, and spheres formed as in Example 1. After washing and drying, black shiny rubbery spheres were produced.

Example 27

To 20 mls. of a 1 M solution of $Al(NO_3)_3 \cdot 9H_2O$ in water was added 0.2 gm. of carob gum, and spheres formed by dropping into 0.880 ammonia solution. After ageing for ½ hour the spheres were opaque, white and plastic. After washing and drying the spheres were yellowish, very hard, and translucent.

Example 28

To 20 mls. of the aluminum solution of Example 27 were added 2 gms. of siccolin (a polysaccharide formed by an alkali-modified starch) and spheres formed as in that example. The spheres were rubbery, opaque and white, and after drying became hard and transparent.

We claim:
1. A process for the production of a metal containing material comprising the steps of:
   (a) contacting a first aqueous solution containing a dissolved water soluble metal salt with a polymeric organic compound having a plurality of hydroxyl groups and being other than a hydroxypropyl methyl cellulose resin which increases in viscosity in the presence of alkaline solution, which polymeric organic compound is capable of forming a viscous solution with said first aqueous solution and of forming a complex with metal ions of said first aqueous solution to form said viscous solution including said complex;
   (b) forming said viscous solution including said complex into at least one entity of selected physical configuration; and
   (c) contacting said formed entity with a second aqueous solution containing a reagent capable of reacting with the metal moiety of said complex to precipitate said metal as an insoluble inorganic compound to convert said metal moiety to said insoluble inorganic compound in said entity, said reagent additionally being capable of precipitating the metal salt of said first aqueous solution.

2. A method according to claim 1 wherein said entity is contacted with said second aqueous solution for a prolonged period of time.

3. A process as claimed in claim 1 wherein said viscous solution is formed into entities having drop configuration and wherein said drops are contacted with said second solution by being introduced drop-wise thereinto.

4. A process as claimed in claim 1 wherein said polymeric organic compound is polyvinyl alcohol.

5. A process as claimed in claim 1 wherein the first aqueous solution is acidic and the second aqueous solution is alkaline.

6. A process as claimed in claim 1 wherein the first aqueous solution is alkaline and the second aqueous solution is acidic.

7. A process as claimed in claim 1 wherein said metal-containing precipitate is dried and heated to drive off the organic compound.

8. A process as claimed in claim 1 wherein said first aqueous solution includes soluble salts of at least two metals, said polymeric organic compound is adapted to form complexes with both said two metals, and said second aqueous solution includes at least one reagent to precipitate both said metals as insoluble compounds.

9. A process as claimed in claim 1 wherein said polymeric organic compound is a polysaccharide.

10. A process as claimed in claim 9 wherein the polysaccharide is selected from the group consisting of dextran, carob gum, gum arabic, and siccolin.

11. A process as claimed in claim 10 wherein the dextran has a nominal molecular weight in the range $10^4$ to $10^6$.

12. A process as claimed in claim 10 wherein the dextran concentration is in the range 5–200% by weight of the metal used.

13. A process as claimed in claim 12 wherein the dextran concentration is in the range 15–100% by weight of the metal used.

14. A process as claimed in claim 1 wherein said entity containing said insoluble compound is heated in a reducing atmosphere to provide said metal containing material as metal particles.

15. A process as claimed in claim 14 wherein said metal comprises chromium and wherein said second aqueous solution is alkaline whereby said metal particles comprise chromium.

References Cited

UNITED STATES PATENTS 3,171,715   3/1965   Kleinsteuber _____ 23—345

FOREIGN PATENTS 1,430,558   1/1966   France.

OTHER REFERENCES

Nuclear Science Abstracts 18–23542, Processes and Reaction Products of High Molecular-Weight Compounds of Inorganic Salts, I. V. Andreeva et al., July 31, 1964.

Nuclear Science Abstracts 16–1784, Negative Chelate Complexes of Lanthanide and Actinide Elements, L. W. Holm et al., Jan. 31, 1962.

BENJAMIN R. PADGETT, Primary Examiner

MICHAEL J. McGREAL, Assistant Examiner